United States Patent [19]

Dunkerley et al.

[11] 3,865,851

[45] Feb. 11, 1975

[54] MANUFACTURE OF ANTHRAQUINONE COMPOUNDS

[75] Inventors: Kenneth Dunkerley; Ronald Wynford Kenyon, both of Blackley, England

[73] Assignee: Imperial Chemical Industries Limited, London, England

[22] Filed: Sept. 1, 1972

[21] Appl. No.: 285,625

[30] Foreign Application Priority Data
Sept. 27, 1971  Great Britain ..................... 44881/71

[52] U.S. Cl. ................. 260/280, 260/378, 260/381, 260/462
[51] Int. Cl. ............................................ C07c 97/14
[58] Field of Search ..................................... 260/380

[56] References Cited
FOREIGN PATENTS OR APPLICATIONS
1,021,634   3/1966   Great Britain ...................... 260/380
10,872   0/1899   Great Britain ...................... 260/380

OTHER PUBLICATIONS

Houben, Das Anthracen und die Anthrachinone, (1929) pp. 342–344 and 435.

*Primary Examiner*—Lorraine A. Weinberger
*Assistant Examiner*—Patrick J. Hagan
*Attorney, Agent, or Firm*—Cushman, Darby & Cushman

[57] ABSTRACT

Process for the manufacture of 1-amino-4:5:8-trihydroxyanthraquinone or 1:4-diamino-5:8-dihydroxyanthraquinone optionally substituted by chlorine or bromine in the 2- and/or 3-positions which comprises subjecting a di(boro-lower alkyl carbonyloxy) complex of 1-amino-4-(hydroxy- or amino-) anthraquinone optionally substituted by chlorine or bromine in the 2- and/or 3-positions to the action of an oxidising agent in oleum.

1 Claim, No Drawings

MANUFACTURE OF ANTHRAQUINONE COMPOUNDS

This invention relates to a process for the manufacture of anthraquinone compounds.

According to the invention there is provided a process for the manufacture of the anthraquinone compounds of the formula:

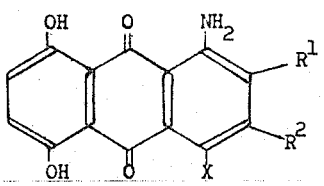

wherein X is a hydroxy or amino group, and $R^1$ and $R^2$ each independently represent hydrogen, chlorine, or bromine, which comprises subjecting a di(boro-lower alkyl carbonyloxy) complex of a compound of the formula:

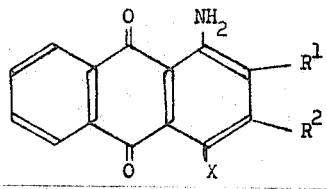

Formula I to the action of an oxidising agent in oleum, and thereafter hydrolysing off the boro-lower alkylcarbonyloxy groups.

The process of the invention can be conveniently brought about by, for example, adding the oxidising agent to a solution of the said complex in oleum, which preferably contains from 5 to 65 percent of free sulphur trioxide, and stirring the mixture at a temperature between −10°C and 30°C until reaction is complete. The reaction mixture is then poured into a mixture of ice and water when hydrolysis of the boro-lower alkylcarbonyloxy groups occurs, and the anthraquinone compound which is precipitated is then isolated in conventional manner.

As examples of oxidising agents which can be used in the process there may be mentioned potassium persulphate, manganese dioxide and lead dioxide.

Throughout this Specification the term "lower alkyl" denotes alkyl radicals containing from 1 to 4 carbon atoms.

The di(boro-loweralkylcarbonyloxy) complexes of the compounds of Formula I can themselves be obtained, for example, by adding boric acid to the appropriate acid anhydride at 120°C, cooling, adding the appropriate compound of Formula I, and stirring at 100°C to complete the reaction. On cooling to 0°C the complex separates out and can be isolated in conventional manner.

The preferred complexes for use in the process of the invention are the di(boroacetates) of the compounds of Formula I, and, above all, it is preferred to use the di(-boroacetates) of 1:4-diaminoanthraquinone or 1-amino-4-hydroxyanthraquinone in the process.

By the process of the invention the said anthraquinone compounds, i.e., the optionally substituted 1-amino-4:5:8-trihydroxyanthraquinones or 1:4-diamino-5:8-dihydroxyanthraquinones, are obtained in high yield and purity. The said compounds are valuable as disperse dyestuffs or can be used as intermediates in the manufacture of other dyestuffs, for example by treating them with acylating or alkylating agents.

The invention is illustrated but not limited by the following Examples in which the parts and percentages are by weight.

EXAMPLE 1

A solution of 2.5 parts of the di(boroacetate) of 1:4-diaminoanthraquinone in 92 parts of 20 percent oleum is cooled to 0°C. 5 parts of potassium persulphate are gradually added, and the mixture is stirred for 4 hours at 0°–5°C. The mixture is then poured into 250 parts of an ice/water mixture, and the precipitated 1:4-diamino-5:8-dihydroxyanthraquinone is filtered off, washed with water and dried. The yield is 77 percent.

The di(boroacetate) of 1:4-diaminoanthraquinone was itself obtained by the addition of 15 parts of boric acid to 130 parts of acetic anhydride over 10 minutes at 120° to 125°C. After cooling to 115°C, 24 parts of 1:4-diaminoanthraquinone were added over 5 minutes, the temperature was raised to 125°C and the mixture stirred at this temperature for 15 minutes. The reaction mixture was cooled to 0°C and the solid filtered off, washed with toluene and dried. The yield as 77 percent.

In place of the 2.5 parts of the di(boroacetate) used in the above Example there are used 2.85 parts of the di(boroacetate) of 1:4-diamino-2:3-dichloroanthraquinone whereby 1:4-diamino-2:3-dichloro-5:8-dihydroxyanthraquinone is obtained in a yield of 72 percent.

This latter di(boroacetate) was obtained in a similar manner to that used for the preparation of the di(boroacetate) of 1:4-diaminoanthraquinone except that an equivalent amount of 1:4-diamino-2:3-dichloroanthraquinone was used as starting material.

EXAMPLE 2

In place of the 2.5 parts of the di(boroacetate) used in Example 1 there are used 2.6 parts of the di(boropropionate) of 1:4-diaminoanthraquinone whereby 1:-4-diamino-5:8-dihydroxyanthraquinone is obtained in a yield of 78 percent.

The di(boropropionate) of 1:4-diaminoanthraquinone was obtained by the method described in Example 1 for the preparation of te di(boroacetate), the acetic anhydride being replaced by an equivalent amount of priopionic anhydride.

EXAMPLE 3

In place of the 2.5 parts of the di(boroacetate) of 1:4-diaminoanthraquinone used in Example 1 there are used 2.5 parts of the di(boroacetate) of 1-amino-4-hydroxyanthraquinone whereby 1-amino-4:5:8-trihydroxyanthraquinone is obtained in a yield of 60 percent.

The di(boroacetate) of 1-amino-4-hydroxyanthraquinone was obtained by the method given under Example 1 for the preparation of the di(-boroacetate) of 1:4-diaminoanthraquinone except that the 24 parts of 1:4-diaminoanthraquinone were replaced by 23.9 parts of a-amino-4-hydroxyanthraquinone.

EXAMPLE 4

5 Parts of manganese dioxide are added to a solution of 2.5 parts of the di(boroacetate) of 1:4-diaminoanthraquinone in 92 parts of 20 percent oleum at 0°C, and the mixture is stirred for 3 hours at 0° to 5°C. The mixture is then poured into 250 parts of an ice/water mixture and the precipitated solid is filtered off, washed with water, and dried. The solid is then extracted with hot β-ethoxyethanol, and the β-ethoxyethanol removed from the extract by distillation at reduced pressure leaving a residue of 0.5 part (35 percent) of 1:4-diamino-5:8-dihydroxyanthraquinone.

Replacement of the 5 parts of manganese dioxide by 5 parts of lead dioxide results in a similar yield of the 1:4-diamino-5:8-dihydroxyanthraquinone.

We claim:

1. Process for the manufacture of an anthraquinone compound of the formula

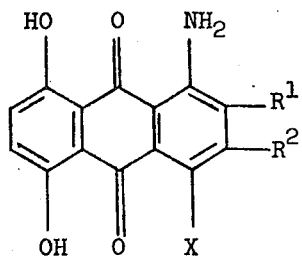

wherein X is a hydroxy or amino group, and $R^1$ and $R^2$ are independently selected from hydrogen, chlorine and bromine, which comprises subjecting a di(boro-loweralkylcarbonyloxy) complex of a compound of the formula

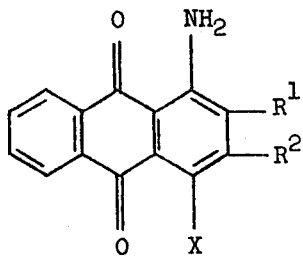

to the action of an oxidizing agent selected from potassium persulfate, manganese dioxide and lead dioxide in oleum at a temperature between −10°C and 30°C and thereafter hydrolyzing off the boro-lower alkylcarbonyloxy groups by pouring the reaction mixture into a mixture of ice and water.

* * * * *